_United States Patent Office_

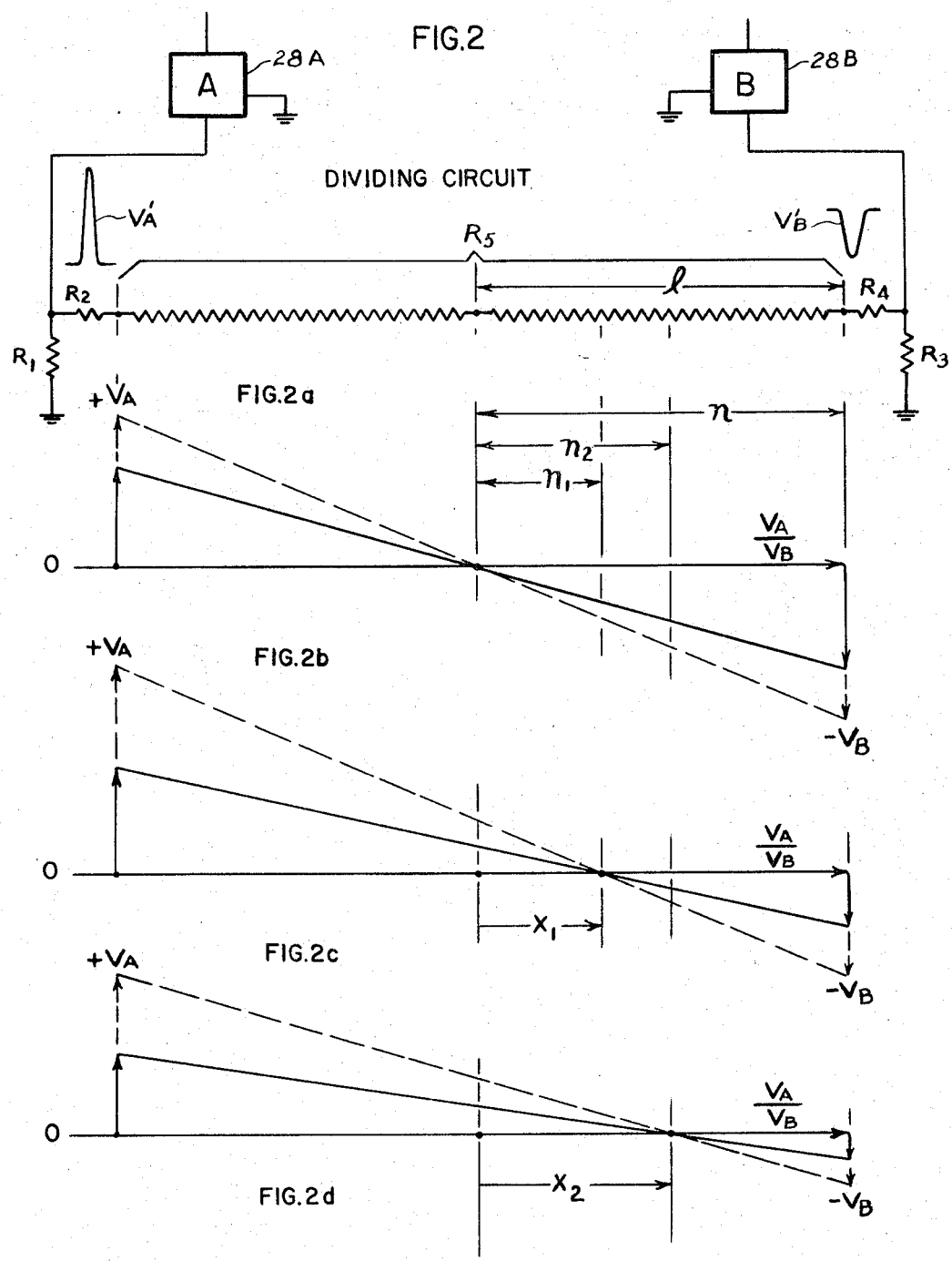

3,370,227
Patented Feb. 20, 1968

3,370,227
APPARATUS TO MEASURE CONTINUOUSLY CORONA INCEPTION AND EXTINCTION VOLTAGES IN MOVING INSULATED CABLE CORES
George Bader, Metuchen, and Rafael Suarez, Avenel, N.J., assignors to General Cable Corporation, New York, N.Y., a corporation of New Jersey
Filed Sept. 20, 1966, Ser. No. 580,651
7 Claims. (Cl. 324—54)

ABSTRACT OF THE DISCLOSURE

Apparatus to measure and locate corona discharges generated in voids, gas-filled or empty spaces within the insulated layer of a cable, or in discontinuities in this insulation or its semi-conducting shields. This is accomplished by subjecting the cable insulation to a radial voltage stress which, if sufficiently high, will produce electrical discharges at the voids, spaces or discontinuities. These electrical discharges will produce transient voltage waves which are detected in a corona probe and then measured, localized and recorded with the equipment described while the cable is continuously moving through the apparatus.

Background and summary of the invention

This invention relates to cable manufacturing and, more particularly, relates to an improved detector for the measurement of ionization inception and extinction voltages in moving insulated cables.

A common problem encountered in the manufacture of electric cable is the inclusion of a void or foreign object in extruded insulation or between overlying layers of insulation or jacketing material. Under the electrical stress during use, early breakdowns are encountered. For example, the gas entrapped in a void will be ionized and the resulting bombardment of the insulation by the ions will adversely affect the insulation, often leading to insulation breakdown. Thus, particularly in recent years, attention has been given to cable testing to locate such faults within the plant where the fault can be corrected. As a result, several types of apparatus for continuous testing of ionization discharges in cable have been devised. One type of apparatus is disclosed in Patent No. 3,346,809, Oct. 10, 1967.

In general, in such type of test apparatus, the cable is subjected to electrical stress of increasing intensity as it moves through the apparatus. When the stress reaches the amplitude necessary to ionize the gas in a void, the breakdown causes a pulse which is detectable. If the detection apparatus is so arranged to provide information as to the position of the void when ionization breakdown occurs, it is then possible to isolate the void and, if the intensity distribution is known, to determine the breakdown voltage.

In the test apparatus known to the art, however, the detection arrangements have had certain drawbacks which impeded the utilization of the test apparatus in production facilities. For example, some detection arrangements are influenced by pulse shape considerations. However, the capacitor couplings used inevitably introduce some pulse shape distortion with resulting inaccuracy. In other arrangements, nonlinear responses are provided which complicate the practical utilization under production conditions.

The present invention is directed at and has for its object providing an improved electrical network to measure and locate the position of ionization discharges in such cable.

Another object of the present invention is to provide an ionization probe, the operation of which is dependent upon pulse amplitude and, thus, is not dependent on pulse shape.

It is a further object of this invention to provide a test apparatus for electric cable in which the cable is subjected to a varying voltage stress as it passes through a probe and which includes a detector to measure the ratio of impulse voltage amplitudes wherein the relationship of the ratios determined is linearly related to position of the void within the probe and, thus, is linearly related to voltage stress applied to the cable.

In accordance with these objects, there is provided, in a preferred embodiment of this invention, a corona probe comprising an elongated liquid-filled body through which the cable is passed. Detectors are mounted adjacent each end of the elongated body and are coupled together by a capacitor stack extending therebetween along the elongated body. The term "capacitor stack" is used herein to designate a series capacitor arrangement and the capacitor circuit. A high voltage source is coupled to a high voltage electrode in contact with the liquid filled probe at the electrical mid-point thereof.

Upon a corona discharge in a void in the cable insulation, a pulse will be capacitively coupled to the capacitor stack and therethrough to the detectors at each end of the stack. The pulse signal from each detector are amplified in identical manner and the pulse from one detector is phase inverted. The amplified signals are then applied across a dividing circuit and are equally spaced therealong. The ratio of the signals applied across the dividing circuit can be determined by the number of flip flop circuits which are tripped on each measurement. The number of operating flip flops is conveniently measured by a summing circuit, the output voltage of which is directly related to the number of operating flip flops. By this arrangement of measuring, the output voltage can be made to be linearly related to the position of the void in the cable insulation in the probe when breakdown in the void occurs.

Thus, the position of the void within the probe can be easily determined, facilitating correction of the cable defect. Also, the ionization initiation or extinction voltage amplitude is easily determinable.

Brief description of the drawings

Having briefly described this invention, it will be described in greater detail, along with other objects and advantages in the following portions of the specification, which may best be understood by reference to the accompanying drawings, of which:

FIG. 2 is an illustrative diagram useful in explanation of the present invention in which FIG. 2a is a schematic diagram of the dividing circuits and FIGS. 2b, c and d are vector diagrams of the voltage distribution in the dividing circuit for different operating conditions.

Description of the preferred embodiment

Figure 1:
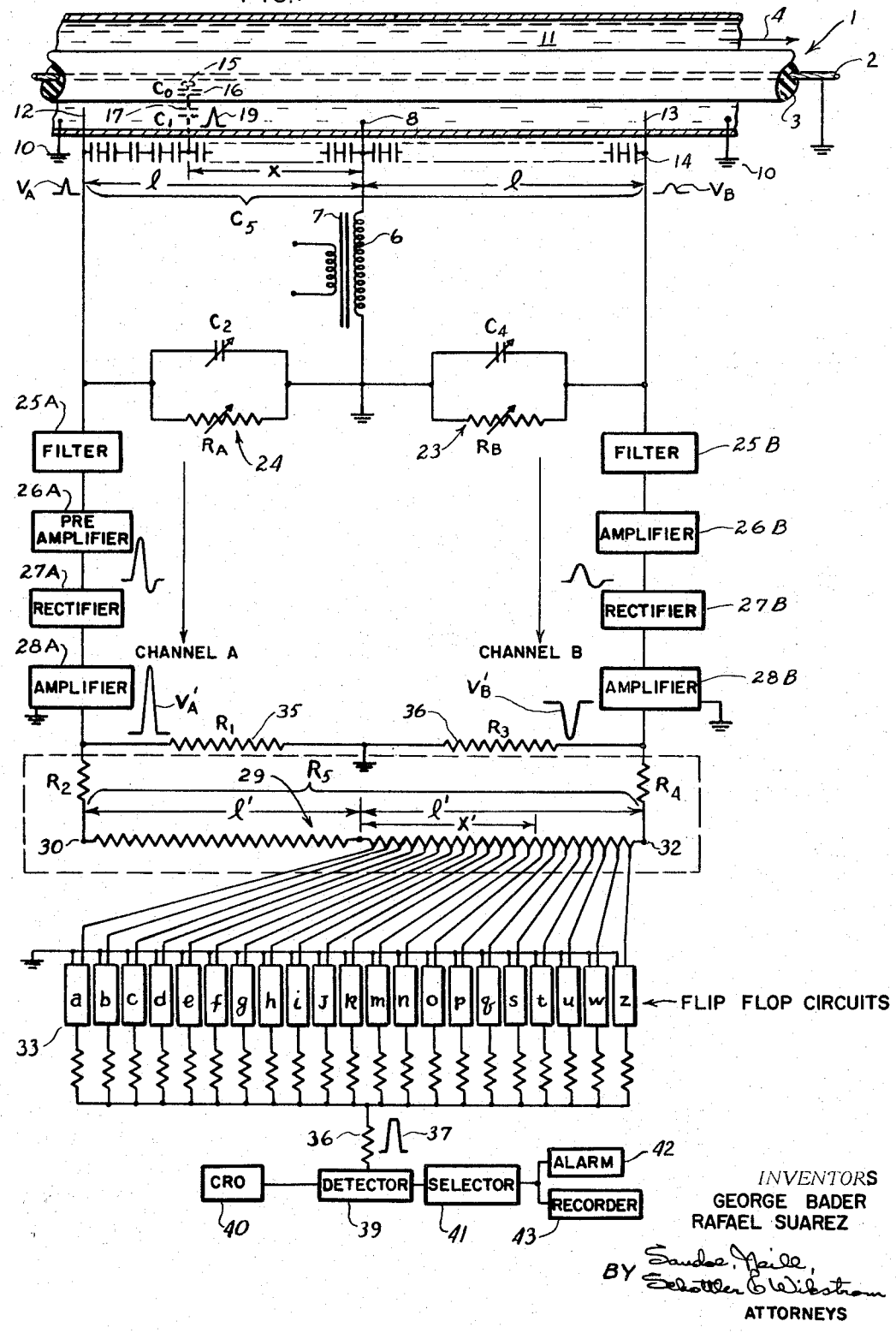
FIG. 1 is a schematic diagram of a circuit for measurement of corona inception and extinction voltages.

In FIG. 1, there is shown a cable 1 consisting of a central conductor 2 and insulation 3 applied thereover. The cable is moved through a corona probe in the direction indicated by arrow 4. In the corona probe, a high voltage is applied from the secondary winding 6 of transformer 7 to an electrically centered electrode 8. Grounded electrodes 10 are located at each end of the probe and the corona probe is filled with liquid 11. Thus, a voltage stress is applied to the cable insulation with the stress varying from zero at the entrance end of the probe to a maximum at the midpoint (at electrode 8) and then again to zero at the exit end. The probe may be constructed in conventional manner as an elongated, tubular, fluid-filled body having electrodes 8 and 10 as concentric electrodes in contact with the fluid in the probe. Detector electrodes 12 and 13 are provided at each end of the probe. The detector electrodes are usually concentric to the tube and capacitively coupled to the fluid and, through the fluid, to the cable. A capacitor stack consisting of a plurality of capacitors 14 connected in series extends along the entire probe being coupled to the high voltage electrode 8 at the midpoint thereof and to the detector electrodes 12 and 13 respectively at the ends of the probe. In some applications, the detector electrodes 12 and 13 may be grounded at the applied power frequency through RC networks 23, 24 respectively to serve as the ground electrodes and electrodes 10 may be omitted.

For the purposes of explanation, it can be assumed that there is a void 15 in the insulation at a distance $x$ from the high voltage electrode 8. If the electrical stress on the void is sufficiently high at this position to initiate a corona discharge, the discharge pulse will be coupled to the capacitor stack through the capacity of the insulation and the fluid respectively indicated by the capacitances 16 and 17.

The pulse represented by wave form 19 will travel through the capacitor stack appearing at the detectors 12 and 13 as pulses indicated by wave forms $V_A$ and $V_B$ respectively. There will be an amplitude variation between the pulses $V_A$ and $V_B$ depending on the impedance introduced by the capacitor stack and, thus, related to the position of the void. There will also be a variation in the pulse shape but with the circuitry of the present invention, pulse shaped variations do not influence the desired measurement. The probes 12 and 13 are coupled to ground through RC networks 23 and 24 respectively. The RC networks are low impedance networks to the power frequency so that the voltage at the high voltage electrode 8 is essentially dropped across the capacitor stack.

The relationship between the ratio of the peak amplitude of voltages $V_A$ and $V_B$ in terms of the position of the void and the values of the circuit components are represented by Equation 1.

(Equation 1)

$$\Delta_p = \frac{V_{A_p}}{V_{B_p}} = \frac{\frac{C_5}{C_2} + \frac{x}{l}}{\frac{C_5}{C_2} + 1 - \frac{x}{l}}$$

where $\Delta_p$=ratio of peak amplitudes
$V_{A_p}$=peak ampliture $V_A$
$V_{B_p}$=peak amplitude $V_B$
$C_5$=net capacitance of stack $C_5$ (FIG. 1)
$C_2$=capacitance of $C_2$ (FIG. 1)
$x$=distance $x$ (FIG. 1)
$l$=distance 1 (FIG. 1)

The derivation of Equation 1 is not given since it has been well explained to the art, for example, in the reference Patent No. 3,346,809.

The voltage pulses $V_A$, $V_B$ at detectors 12 and 13 are processed through similar channels A and B, each containing a high pass filter 25C, 25B, a preamplifier stage 26A, 26B, a rectifier stage 27A, 27B and an amplifier 28A, 28B respectively. The filter is a high pass filter to eliminate power frequency effects. The preamplifier amplifies the signal. The rectifier eliminates negative components. The amplifiers 28A and 28B amplify the respective signals in channels A and B. However, the signal in channel B is inverted. The output signal $V_A'$ of channel A which is positive and the output signal $V_B'$ of channel B which is negative is tapped from the load resistors 35, 36 respectively and applied across dividing circuit 29. $V_A'$ and $V_B'$ are amplified by the same amount in the respective channels and are, thus, related to $V_A$ and $V_B$ by the same factor. Since the voltage $V_A'$ is of positive polarity and the voltage $V_B'$ is of negative polarity by the circuit conditions, the application of the voltages across the dividing circuit $R_2$, $R_5$ and $R_4$ will provide a voltage distribution along $R_5$ which will vary from a positive potential at the terminal 30 to a negative potential at terminal 32, when $R_2=R_4$. At some point $x'$ from the midpoint of the resistance, a crossover point will exist when the voltage amplitude is zero as the polarity changes from positive to negative. The voltage ratio of the applied voltage in terms of the divider circuit constants is expressed by Equation 2.

(Equation 2)

$$\Delta_D = \frac{V_{A'_D}}{V_{B'_D}} = \frac{V_{A_D}}{V_{B_D}} = \frac{\frac{R_2}{R_5} + \frac{x'}{l}}{\frac{R_2}{R_5} + 1 - \frac{x'}{l}}$$

if $R_1 = R_3$ and $R_2 = R_4$ where $\Delta_D$=voltage ratio in divider circuit
$V_{A'_D}$=peak voltage amplitude $V_A'$
$V_{A_D}$=peak voltage amplitude $V_A$
$V_{B'_D}$=peak voltage amplitude $V_B'$
$V_{B_D}$=peak voltage amplitude $V_B$
$R_2$=resistance $R_2$ (FIG. 1)
$R_5$=resistance $R_5$ (FIG. 1)
$x'$=distance $x'$ (FIG. 1)
$l'$=distance $l'$ (FIG. 1)

By comparing Equations 1 and 2, it can be seen that if the factor $R_2/R_5$ (Equation 2) is made equal to the factor $C_5/C_2$ (Equation 1) that a measurement of the ratio $x'/l'$ will provide information as to the ratio $x/l$. Thus, by determination of the position of the crossover point, the position of the void in the probe at the time of ionization breakdown can be established. Further, due to the linear relationship between detector circuitry and probe stress distribution, the position of the crossover along the resistance $R_5$ is directly related to ionization inception voltage. By reversal of direction of travel of the cable, ionization extinction can be determined.

In order to locate the crossover point along $R_5$ and, thus, determine the distance $x'$, a plurality of flip flop circuits 33a–z are positioned equi-distantly along one half of the resistor $R_5$. It is only necessary to provide flip flops along one half of the resistor $R_5$ since the position of the zero point can never move into the other half of the resistor under the conditions specified (i.e. $V_A'$ positive; $V_B'$ negative).

The flip flop circuits are conventional, generating a predetermined output signal when tripped. In the circuit of FIG. 1, the flip flops are triggered by a positive input voltage. Thus, all flip flops to the positive side of the crossover will trip and the flip flops to the negative-going side of the crossover will remain unfired to provide an indication of the position of the crossover point. The movement of the crossover in the resistor $R_5$ is best illustrated in FIG. 2, to which reference will also be made.

FIG. 2 is a composite figure. In FIG. 2a, there is shown the dividing circuit and the voltages $V_A'$ and $V_B'$. FIGS. 2b, c and d illustrate the shift of the null position along the resistor $R_5$ for different ratios between voltage amplitudes of $V_A$ and $V_B$.

In the example of FIG. 2b, there is shown the case where the voltage $V_A'$ is equal to the voltage $V_B'$. When the ratio $V_A$ divided by $V_B$ is equal to or less than 1, the null position is coincident with the midpoint of resistor $R_5$. Thus, the flip flops 33 of FIG. 1, tripped by a positive voltage, will all remain "off."

In FIG. 2c, the amplitude of $V_A$ is larger than the amplitude of $V_B$. In this case, the null shifts $x$ units from the center. $N_1$ flip flops are under positive potential and will be tripped.

In FIG. 2d, there is shown the condition where $N_2$ flip flops are tripped.

In FIGS. 2b–d, it is also shown that the amplification of $V_A$ and $V_B$ are immaterial if identical. It is also apparent to those skilled in the art that the shape of the pulse in the individual channels has no effect on the ultimate measurement of the ratio therebetween.

Counting of the number of operating flip flops is conveniently accomplished by the summing circuitry of FIG. 1. For this purpose, the flip flops are coupled through a common load resistor 36. Since the current flow through each operating flip flop is substantially identical, the amplitude of the voltage across resistor 36 will be equal to the number of flip flops tripped as indicated by wave form 37.

Thus, the amplitude of the output pulse 37 is linearly related to position of the crossover and, thus, linearly related both to the distance $x$ of the void on breakdown and the initiation voltage for ionization breakdown.

The direct linear relationship facilitates application of the apparatus to production facilities. The output can be coupled to a detector 39, oscilloscope 40, and through selector 41 to an alarm 42 and/or recorder 43.

The selector permits selection of the voltage amplitude tripping the alarm circuit. Thus, if cable specifications establish a voltage level below which no ionization discharges may occur, the selector can be set to trip the alarm only when ionization discharges below such set voltage level occur. The alarm can stop cable movement or can trip a cable marking device to facilitate repair.

A recorder may be employed to record the ionization discharges during testing of cable and the oscilloscope used for visual control.

This invention may be variously modified and embodied within the scope of the subjoined claims.

What is claimed is:

1. An apparatus to detect, measure and localize voids, spaces or discontinuities in insulated electrical cables comprising a probe, said probe being provided with a high voltage electrode at the center thereof and a first and second detector equally spaced apart from said high voltage electrode, fluid coupling means in contact with said high voltage and detector electrodes, means for charging said high voltage electrode with an alternating high voltage, a capacitor stack coupled between said detector electrodes, the electrical center of said capacitor stack being coupled to said high voltage electrode, a divider resistor having a first and second terminal, a first amplifier means for deriving a signal from said first detector electrode amplifying said signal, and applying said amplified signal with a positive polarity to said first terminal of said divider resistor, a second amplifier means for deriving a signal from said second detector, amplifying said signal by the same factor as said first amplifier means, and applying said signal with negative polarity to said second terminal of said resistor, and means for determining the position of the crossover point, zero voltage amplitude, along said resistor where the polarity of the voltage changes from negative to positive.

2. A cable testing apparatus in accordance with claim 1 which includes a first capacitor coupling said first detector to ground, a second capacitor coupling said second detector to ground, a first resistor coupling said first amplifier means to said first terminal of said divider resistor, a second resistor coupling said second amplifier means to said second terminal of said divider resistor and in which the ratio of the capacitance of said capacitor stack to the capacitance of said first capacitor is equal to the ratio of said first resistor to the resistance of said divider resistor.

3. A cable testing apparatus in accordance with claim 1 which includes a plurality of flip flop circuits coupled to said divider resistor at equal increments of resistance apart, each of said flip flop circuits being triggered by a positive potential on said divider resistor, and means for counting the number of said flip flops triggered when a signal is detected by said first and second detectors.

4. A cable testing apparatus in accordance with claim 3 in which said flip flop circuits are coupled to said divider resistor between said second terminal and the midpoint of said divider resistor.

5. A cable testing apparatus in accordance with claim 1 in which said first amplifier means comprises a first high pass filter, a first preamplifier, a first rectifier means for elimination of negative-going signals, and a first amplifier, and in which said second amplifier means comprises a second high pass filter, a second preamplifier, a second rectifier means for elimination of negative-going signals, and a second amplifier for amplifying said signal, and for reversing the polarity thereof.

6. A cable testing apparatus in accordance with calim 3 in which said counting means comprises a common load resistor coupled to all of said plurality of flip flops, and which includes means for measuring the amplitude of said signal to determine the number of flip flops triggered.

7. A cable testing apparatus in accordance with claim 6 which includes a detector coupled to said common load resistor to detect a signal on said load resistor, and which includes circuit means responsive to said detected signal to generate an indication of the amplitude thereof.

References Cited

UNITED STATES PATENTS

| | | | |
|---|---|---|---|
| 2,315,450 | 3/1943 | Nyquist | 324—52 |
| 2,493,800 | 1/1950 | Biskeborn | 324—52 |
| 2,962,714 | 11/1960 | Meixell et al. | |

RUDOLPH V. ROLINEC, *Primary Examiner.*

G. R. STRECKER, *Assistant Examiner.*